United States Patent
Kuehn et al.

(10) Patent No.: US 8,667,774 B2
(45) Date of Patent: *Mar. 11, 2014

(54) COANNULAR DUCTED FAN

(75) Inventors: Mark S. Kuehn, Gilbert, AZ (US);
Daniel A. Nyhus, Payson, AZ (US);
Timothy G. Brewer, Mesa, AZ (US)

(73) Assignee: The Boeing Company, Chicago, IL (US)

(*) Notice: Subject to any disclaimer, the term of this patent is extended or adjusted under 35 U.S.C. 154(b) by 1205 days.

This patent is subject to a terminal disclaimer.

(21) Appl. No.: 12/536,338

(22) Filed: Aug. 5, 2009

(65) Prior Publication Data

US 2011/0030336 A1 Feb. 10, 2011

(51) Int. Cl.
*F02K 3/02* (2006.01)

(52) U.S. Cl.
USPC ............. 60/226.1; 60/262; 60/226.3; 60/269; 244/12.1; 244/230; 244/231; 417/363

(58) Field of Classification Search
USPC ............. 60/226.1, 262, 226.3, 269; 417/363; 244/12.1, 230, 231
See application file for complete search history.

(56) References Cited

U.S. PATENT DOCUMENTS

| | | | | |
|---|---|---|---|---|
| 4,791,783 A * | 12/1988 | Neitzel | | 60/262 |
| 5,114,100 A * | 5/1992 | Rudolph et al. | | 244/134 C |
| 5,261,227 A * | 11/1993 | Giffin, III | | 60/226.1 |
| 5,562,419 A * | 10/1996 | Crall et al. | | 416/190 |
| 6,751,946 B2 * | 6/2004 | Li | | 60/269 |
| 6,786,036 B2 * | 9/2004 | Kight | | 60/204 |
| 7,559,191 B2 * | 7/2009 | Parks | | 60/204 |
| 2008/0089788 A1 * | 4/2008 | Loehle et al. | | 416/191 |
| 2009/0245998 A1 | 10/2009 | Guemmer | | |

FOREIGN PATENT DOCUMENTS

| | | |
|---|---|---|
| EP | 1201878 A2 | 5/2002 |
| EP | 1914384 A2 | 4/2008 |
| WO | 2009068048 A1 | 6/2009 |

* cited by examiner

*Primary Examiner* — Phutthiwat Wongwian
*Assistant Examiner* — Craig Kim
(74) *Attorney, Agent, or Firm* — Felix L. Fischer

(57) ABSTRACT

Secondary air flow is provided for a ducted fan having an engine core driving a fan blisk. The fan blisk incorporates a set of thrust fan blades extending from an outer hub and a set of integral secondary flow blades extending intermediate an inner hub and the outer hub. A nacelle provides a first flow duct for the thrust fan blades and a secondary flow duct carries flow from the integral secondary flow blades.

13 Claims, 9 Drawing Sheets

COANNULAR DUCTED FAN

REFERENCE TO FEDERALLY SPONSORED RESEARCH

This invention was made with Government support under Contract Number FA8650-05-2-3503 awarded by the Air Force. The Government has certain rights in this invention.

REFERENCE TO RELATED APPLICATIONS

This application is copending with application Ser. No. 12/536,426 filed substantially concurrently herewith entitled DUCTED FAN ENGINE WITH INTEGRATED SECONDARY FLOW BLADES.

BACKGROUND INFORMATION

1. Field

Embodiments of the disclosure relate generally to the field of ducted fan engines and more particularly to embodiments for integral central blading in the fan for secondary air ducting.

2. Background

Ducted fan engines provide high bypass ratios for an efficient propulsion system for air vehicles. By nature, the fan element provides thrust using air displaced through the nacelle or duct surrounding the fan. In most cases, the motive element for the fan, a reciprocating engine or turbojet core is axially aligned with the fan and the fan airflow is directed around the engine or core. Configurations with tractor or pusher style fan/engine integrations may be employed.

Use of a tractor style engine and fan arrangement may be particularly beneficial where integration of the engine and fan in a blended wing body configuration is desired. In certain applications, airflow in addition to the thrust flow created by the fan is required for operational requirements of the engine. Ducting of flow directly from the thrust fan may result in undesirable losses or aerodynamic inefficiencies.

Other turbine engine applications including generators and pumps as well as large turbine or bladed flow devices such as water turbines and wind turbines may additionally require multiple flow paths for the working fluid.

It is therefore desirable to provide a fan having multiple airflow paths to accommodate secondary flow requirements.

SUMMARY

Exemplary embodiments provide a ducted fan having an engine core driving a fan blisk. The fan blisk incorporates a set of thrust fan blades extending from an outer hub and a set of integral secondary flow blades extending intermediate an inner hub and the outer hub. A nacelle provides a first flow duct for the thrust fan blades and a secondary flow duct carries flow from the integral secondary flow blades.

In one exemplary configuration, an embodiment incorporates a turbine engine core including a power shaft for fan attachment. A fan blisk is attached to the power shaft in a tractor configuration. The fan blisk incorporates a set of thrust fan blades extending from an outer hub, a set of integral secondary flow blades extending intermediate an inner hub and the outer hub. A flange spans the inner hub forming a secondary air plenum with a shroud. A nacelle provides a first flow path for primary air flow from the thrust fan blades and the shroud provides a second flow path for secondary air flow from the secondary flow blades. In an exemplary configuration, a plurality of interconnected base gores for stator blades extending to the nacelle forms the shroud aligned with the outer hub and carrying secondary air flow from the integral secondary flow blades. A concentric spinner engages the inner and outer hub for secondary air flow. An inner cap and concentric outer semi-toroidal cap of the spinner form an inlet nozzle for secondary air.

A method for fabrication and operation of the exemplary embodiments includes machining thrust blades intermediate an outer hub and a nacelle inner radius in a fan blisk and machining secondary flow blades intermediate an inner hub and the outer hub. The fan blisk is then mounted on a fan shaft and a nacelle is provided for flow from the thrust blades. A secondary flow path is provided for flow from the secondary flow blades.

Mounting a concentric spinner with inner cap and outer toroidal cap to the inner and outer hubs respectively provides for entraining flow into the secondary flow blades. Additionally, mounting the fan blisk on a fan shaft extending through a shroud forms a plenum. Directing secondary flow into the shroud allows use of the secondary air flow for cooling or alternative uses.

The configurations disclosed in the embodiments may be employed in air vehicles to provide secondary air for various systems including, as examples, air for pressurization of deicing boots and boundary layer control.

The features, functions, and advantages that have been discussed can be achieved independently in various embodiments of the present invention or may be combined in yet other embodiments further details of which can be seen with reference to the following description and drawings

DETAILED DESCRIPTION

Figure 1:
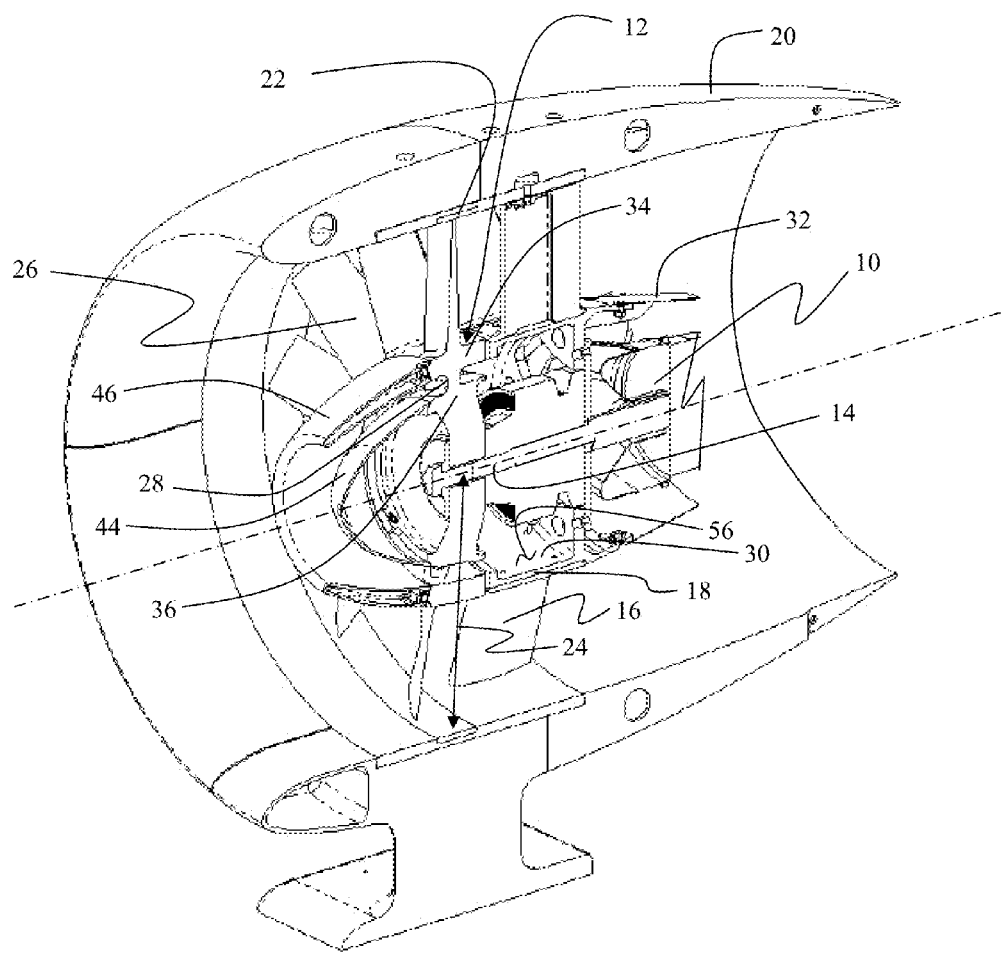
FIG. 1 is an isometric partial section view of an embodiment of a fan blisk integration in a tractor engine arrangement with a portion of the engine core shown in phantom.
Figure 2:
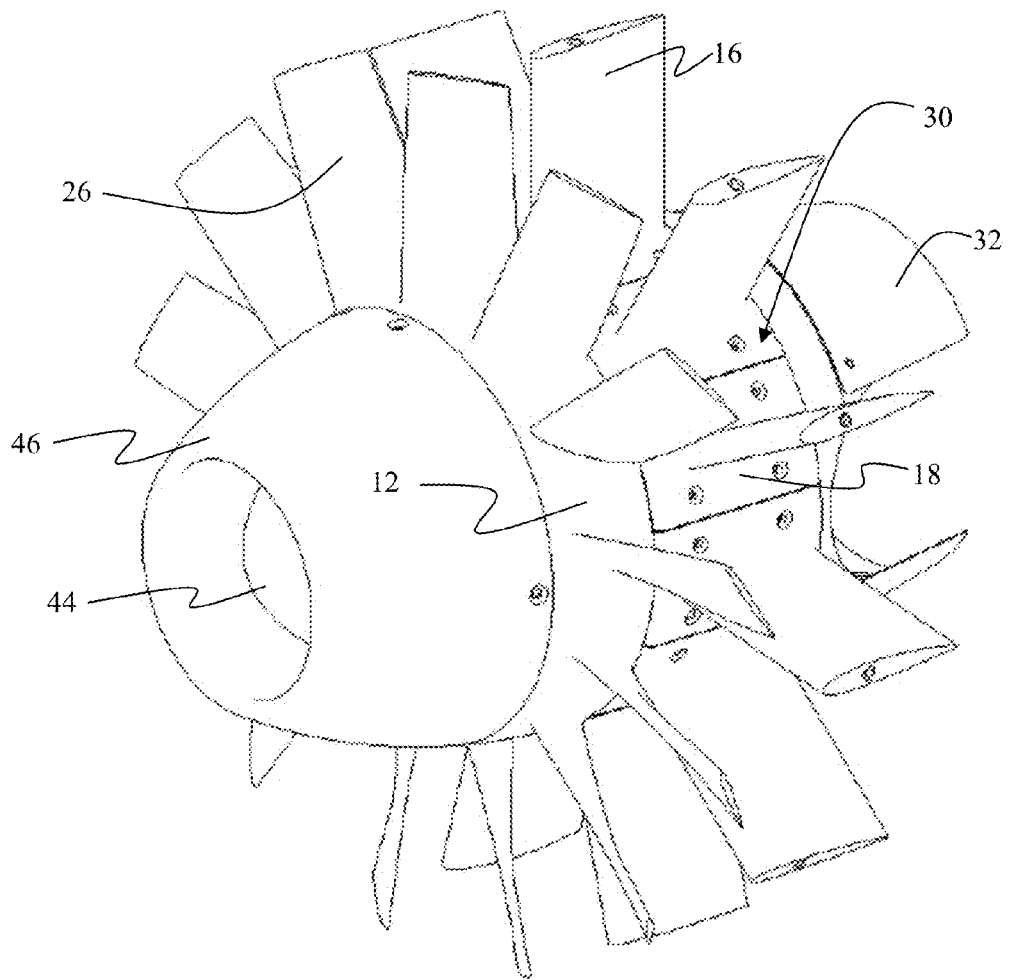
FIG. 2 is an isometric view of the embodiment of FIG. 1 without the nacelle.
Figure 3:
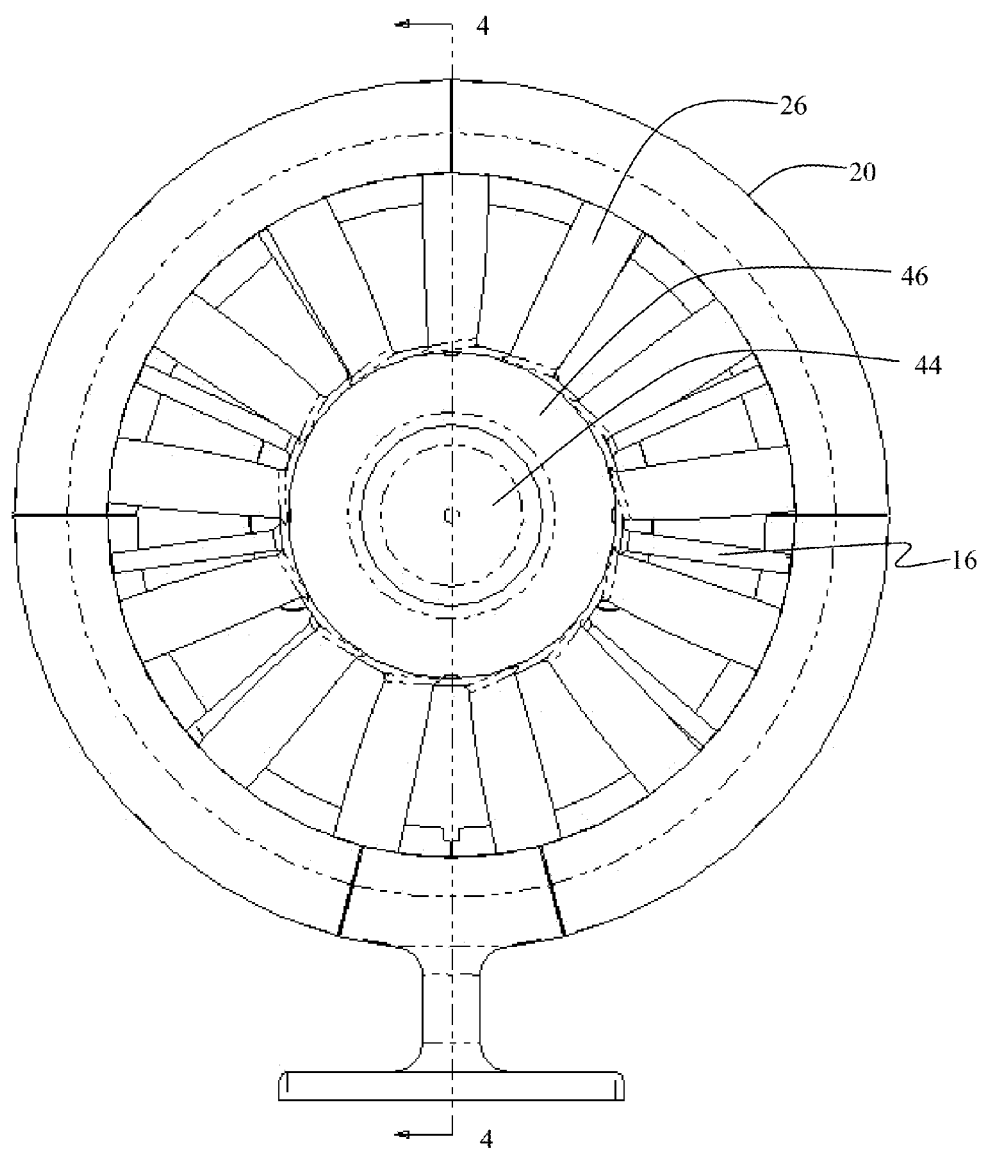
FIG. 3 is a front view of the embodiment of FIG. 1.

The embodiments described herein disclose a ducted fan with integral central blading to provide alternate non-propulsive air flow for use associated with an engine driving the fan in a tractor arrangement. An exemplary engine for the embodiment disclosed herein is a JetCat SPT5 turboprop produced by JetCat USA, 4250, Aerotech Center Way Bldg. G Paso Robles, Calif. 93446. FIGS. 1 through 4 show an embodiment employing a turbine engine core 10 driving a fan blisk 12 with a power shaft 14. Stators 16 extending from base gores 18 provide aerodynamic flow control as well as structural continuity with a nacelle 20.

Figure 4:
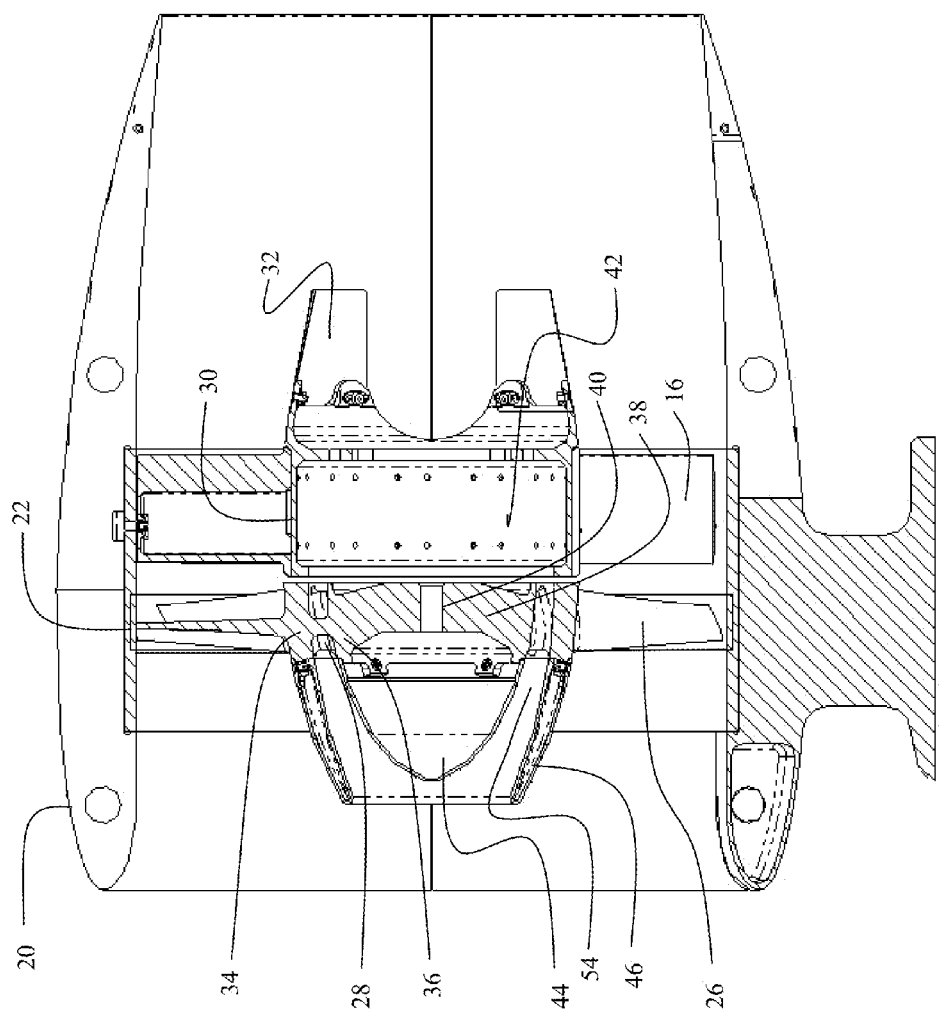
FIG. 4 is a side section view of the embodiment along line 4-4 of FIG. 3.

As best seen in FIGS. 1 and 4, an integral thrust fan shroud 22 is carried by the nacelle 20 and incorporates a rub-strip minimizing the clearance and providing an inner radius 24 of the nacelle closely matched to the fan thrust blade tip radius for maximized performance. The thrust fan shroud 22 may also constitute a containment ring in which the rub strip is imbedded to provide burst protection in the event of blade separation. The nacelle 20 provides ducting of the primary thrust air flow from the fan thrust blades 26. Secondary flow from the secondary flow blades 28 in the fan blisk 12 is separated from the primary flow by ducting, described in greater detail subsequently, and is available for usage associated with the engine or alternative secondary air flow requirements. Exemplary uses of the secondary flow may be as cooling air for engine components, combustion air for the engine core, bleed air for pressurization or pneumatic actuation systems, or lift control such as boundary layer injection. In the embodiment shown, stator base gores 18 attach to or integrally form a shroud 30 as the secondary air flow duct. A diffuser 32 extends from the gear case shroud for control of expansion of the thrust flow and separation of the thrust flow and secondary flow for downstream mixing.

As an exemplary usage of the disclosed embodiment, the configuration shown in the drawings is particularly adapted to be employed in a blended wing body application such as the Boeing X-48B. Additional applications/uses for turbofans incorporating the embodiments defined herein include: Radio Controlled (hobby) aircraft, Unmanned Aerial Vehicles (UAVs), Remotely Piloted Vehicles (RPVs), Drones and, potentially, piloted aircraft.

Figure 5:
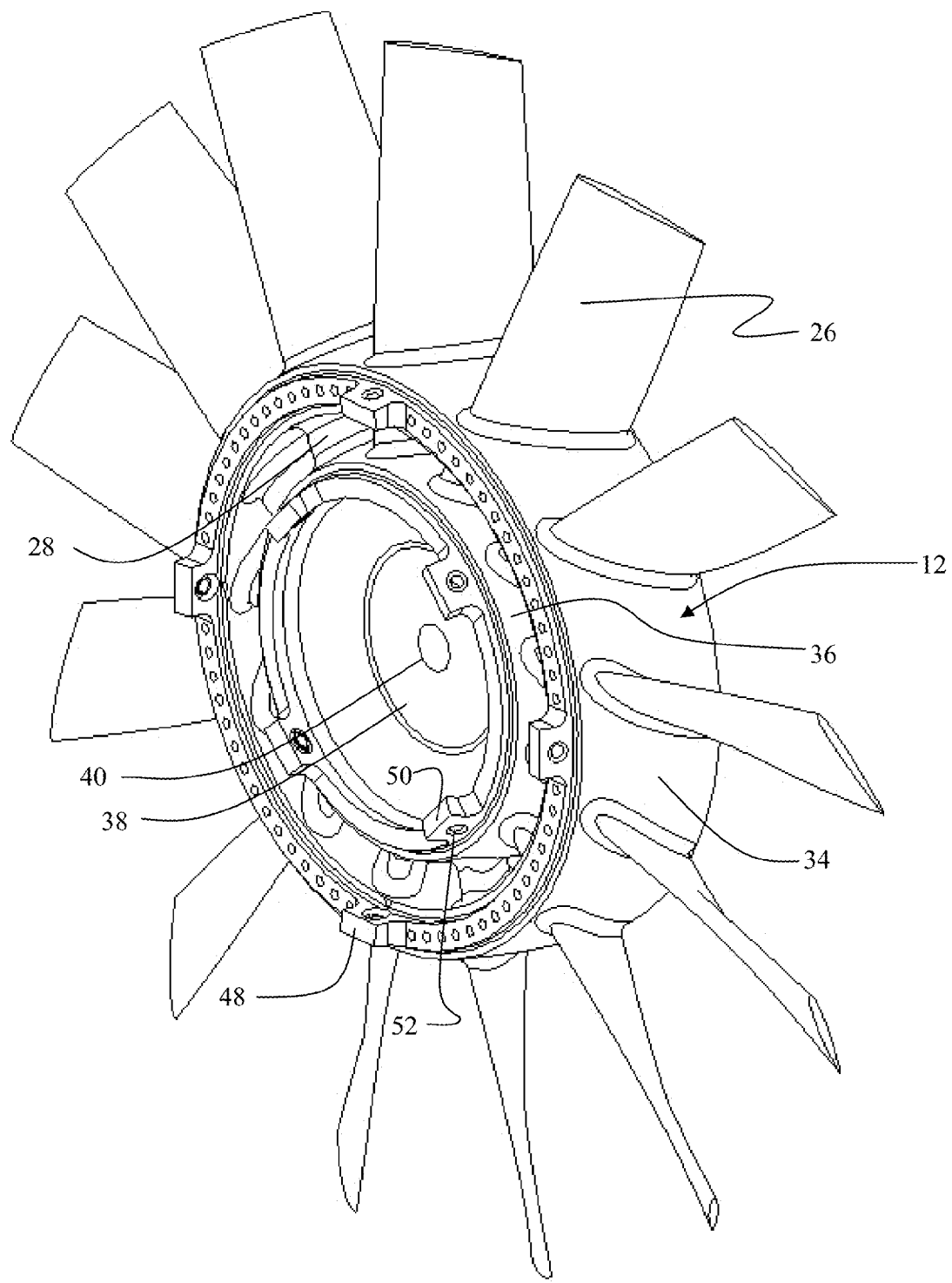
FIG. 5 is an isometric front view of the fan blisk of the embodiment of FIG. 1 with integral secondary flow blades.
Figure 6:
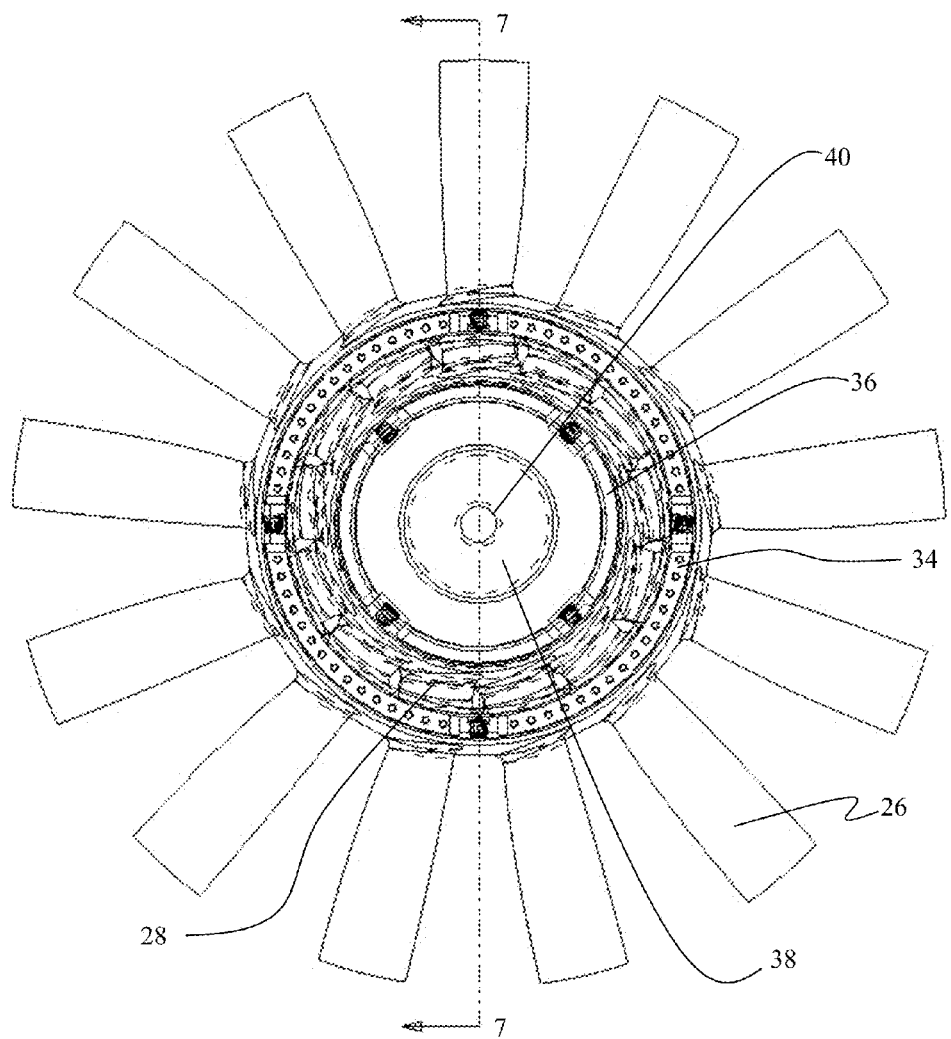
FIG. 6 is a front view of the fan blisk.
Figure 7:
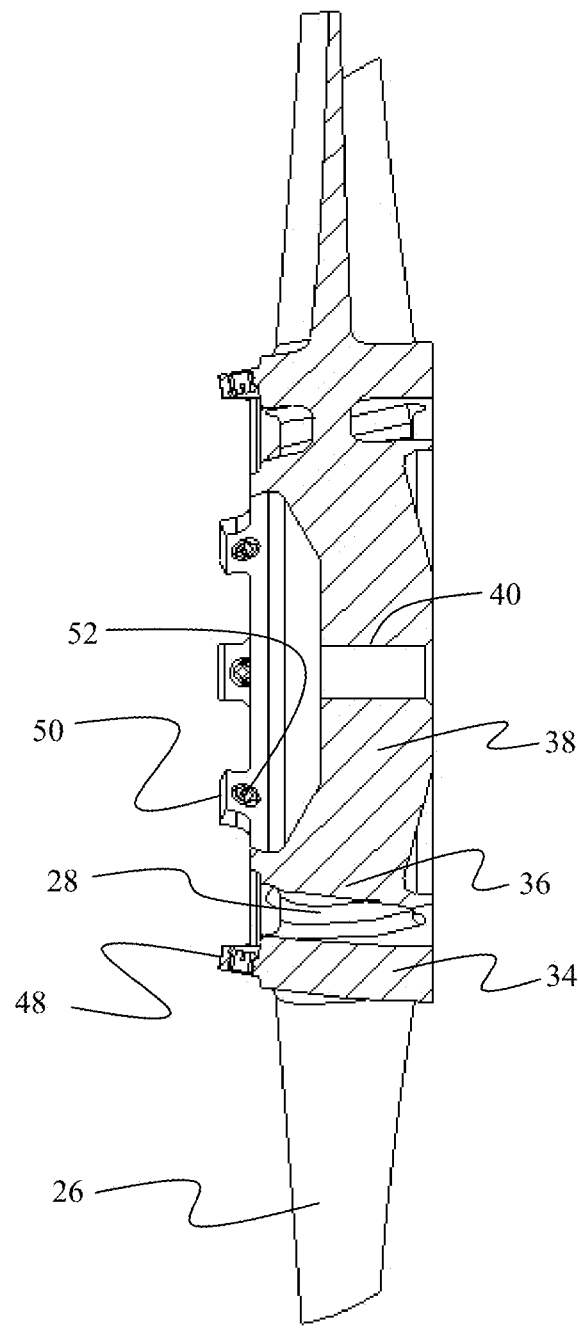
FIG. 7 is a side section view of the fan blisk along line 7-7 of FIG. 6.

The fan blisk 12 is shown in detail in FIGS. 5, 6 and 7. Multiple thrust blades 26 extend from an outer hub 34. An inner hub 36 supports an attachment flange 38 which spans the inner hub as a web and incorporates a central bore 40 to receive power shaft 14 (seen in FIG. 1). Weight reduction may be accomplished by contour machining of the flange. Integral secondary flow blades 28 extend between inner hub 36 and outer hub 34, providing structural continuity for supporting the outer hub and providing a secondary air flow. Outer hub 34 is concentric with the shroud 30 (as best seen in FIG. 4). The inlet of the shroud 30 has the same inner diameter and outer diameter as the outer hub 34 for the embodiment shown. Airflow generated by the integral secondary flow blades 28 flows from the fan blisk 12 through the shroud 30 for use by the engine or alternative systems as previously described. For the embodiment shown, a plenum 42 is created by the shroud 30 intermediate the fan blisk 12 and engine core 10 from which the secondary air may be drawn for use. For the embodiment shown, the secondary flow exits the plenum 42 through the flow diffuser 32 which minimizes aerodynamic losses of the thrust flow by controlling the flow expansion aft of the stators between the inner geometric profile of the nacelle and outer profile of the diffuser. Aft of the secondary air plenum, the secondary air continues to flow between the outer profile of the engine and inner profile of the diffuser which provides an outer boundary for the secondary flow until the thrust flow is expanded sufficiently for mixing with the secondary flow. At the end of the diffuser, the thrust and secondary flows are combined to provide a single flow path as the air exits the nacelle. In alternative embodiments, all secondary air may be withdrawn from the plenum through additional ducting.

For the embodiment shown, the number of thrust blades 26 and secondary flow blades 28 is identical with coaxial positioning of the blades and comparable cord for enhanced structural strength in the fan blisk 12. In alternative embodiments, the height, number and positioning of secondary blades as well as the cord and aerodynamic profile may differ from the thrust blades to accommodate secondary airflow requirements. Tailoring of secondary blade geometry to accommodate desired flow and pressure conditions in the plenum 42 may be accomplished. Use of a prime number of fan blades is employed to minimize harmonic resonance in the fan blisk 12. The fan blisk described for the exemplary embodiment of the drawings uses the prime number thirteen fan blades. Alternate (non prime) blade counts may also be employed to meet the intended thrust requirements or alternative embodiments. Similarly, the embodiment disclosed employs a prime number of stator blades also to minimize harmonic resonances. For the embodiment shown, eleven stator blades 16 are employed.

Returning to FIGS. 1 through 4, a dual concentric spinner having inner cap 44 and an outer semi-toroidal cap 46 is attached to the inner and outer hubs 36, 34 of the fan blisk 12 using attachment stubs 48, 50 each having a bore 52 (as seen in FIGS. 5 and 7) to receive a securing fastener. Secondary airflow is drawn through the dual concentric spinner for flow entrainment by the integral secondary flow blades 28. The secondary flow inlet 54 created by the inner cap 44 and outer semi-toroidal cap 46 provides a contoured flow path to minimize aerodynamic losses and fan inlet pressure distortions. The secondary flow inlet 54 in the concentric spinner accelerates the flow prior to entering the secondary flow blades 28. By minimizing radial flow in the secondary fan, efficiency is improved for the secondary flow introduced to the secondary flow blades. For the embodiment shown, the shroud 30 is supported by base gores 18 attached to a cylindrical stator hub 56 which additionally includes attachment tangs 58 extending radially inward for attachment of the engine core or other structural members associated with the ducted fan. In certain embodiments, the cylindrical ring 56 in conjunction with an aft sealing plate (not shown) attached to the tangs 58 may provide sealing of the plenum 42 formed by shroud 30 to assist in redirection of secondary air. The sealing provided by the cylindrical ring 56 prevents flow leakage between the inner and outer flow paths. For embodiments where a significant pressure differential exists between the inner and outer flows, a rotating knife-edge seal may be employed between cylindrical stator hub 56 and outer hub 34 of the blisk to prevent any significant leakage.

Figure 8:
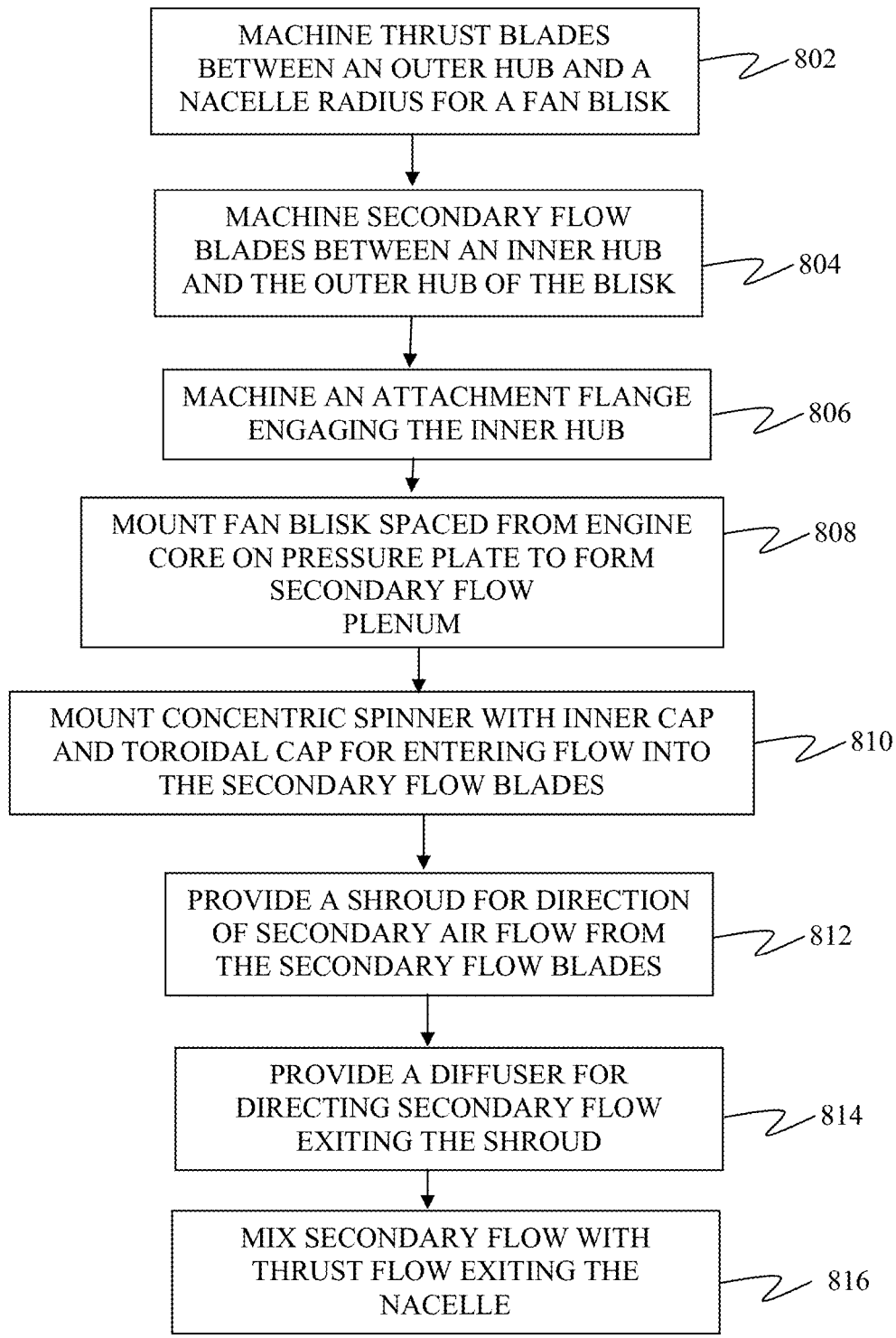
FIG. 8 is a flow chart of a method of implementing the embodiment disclosed herein; and, FIG. 9 is a system schematic view of an air vehicle showing de-icing and boundary layer control applications for the embodiments.

A method for providing secondary airflow for a turbine engine and exemplary use of the secondary flow for the embodiment disclosed herein is outlined in FIG. 8. A fan blisk is created by forming thrust blades between an outer hub and a nacelle inner radius, step 802. Secondary flow blades are formed between an inner hub and the outer hub, step 804. For the embodiments disclosed nylon is employed as the blisk material and forming is accomplished by machining. However, additional materials such as aluminum and manufacturing processes such as molding, diffusion bonding, super plastic forming, autoclaving, selective laser sintering (SLS) or other rapid prototyping technologies may be employed to manufacture the blisk to its outer mold line specifications. The attachment flange engaging the inner hub may be additionally formed for relief volumes and weight reduction, step 806. For the embodiment shown, the fan blisk is mounted on a fan shaft and spaced from an engine core to form a plenum, step 808. A concentric spinner with inner cap and outer toroidal cap is mounted to the inner and outer hubs respectively, step 810, for entraining flow into the secondary flow blades. A secondary flow path, in the embodiment shown, a shroud, is provided for direction of secondary flow, step 812. For the embodiment shown, the secondary flow is directed by the shroud around component of the engine core for cooling. A diffuser is provided for directing secondary flow exiting the shroud, step 814, and mixing secondary flow with thrust flow exiting the nacelle, step 816.

Figure 9:
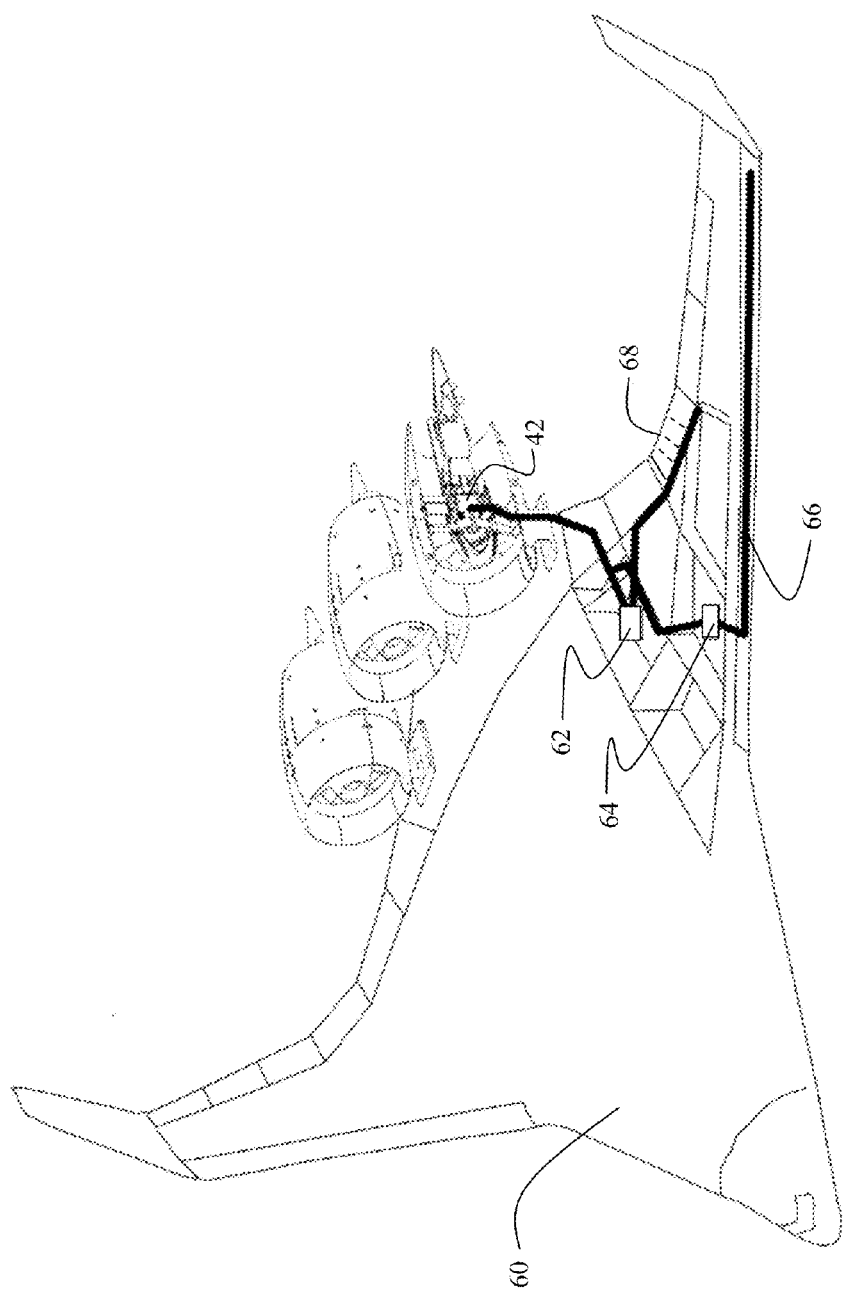

As shown in FIG. 9, the secondary air may be employed for bleed air for pressurization or pneumatic actuation systems such as deicing, or lift control such as boundary layer injection. Air vehicle 60 mounts multiple engines each having a nacelle 22 incorporating an embodiment as disclosed above. Secondary flow from the plenum 42 of one or more of the engines is routed through control valves 62 and 64 for use as pressurization air for a pneumatic deicing boot 66 and boundary layer control air for lift increase on flaps 68 as exemplary systems.

Having now described various embodiments of the invention in detail as required by the patent statutes, those skilled in the art will recognize modifications and substitutions to the specific embodiments disclosed herein. Such modifications are within the scope and intent of the present invention as defined in the following claims.

What is claimed is:

1. A ducted fan comprising:
   an engine core;
   a fan blisk connected to the engine core, the fan blisk comprising
     a set of thrust fan blades extending from an outer hub;
     a set of integral secondary flow blades extending between an inner hub and the outer hub;
   a nacelle providing a first flow duct for the thrust fan blades;
   a shroud having an inlet concentric with the outer hub carrying flow from the integral secondary flow blades; and,
   a flange in the inner hub, said flange, engine core and shroud forming a plenum for secondary air with flow exiting the plenum through a diffuser for rejoinder with a primary flow from the thrust fan blades.

2. The ducted fan of claim 1 wherein the engine core is a turbine including a power shaft for driving the fan blisk and said flange in the inner hub incorporates a bore to receive the power shaft.

3. The ducted fan of claim 1 wherein the shroud includes a plurality of interconnected base gores for stator blades extending to the nacelle.

4. The ducted fan of claim 1 further comprising a concentric spinner engaging the inner and outer hub for secondary air flow.

5. The ducted fan of claim 1 wherein the thrust blades and secondary flow blades are equal in number and coaxially located.

6. The ducted fan of claim 4 wherein the concentric spinner includes an inner cap and concentric outer semi-torroidal cap forming an inlet flow path for secondary air.

7. A turbine ducted fan comprising:
   a turbine engine core including a power shaft;
   a fan blisk attached to the power shaft and spaced from the engine core, the fan blisk incorporating
     a set of thrust fan blades extending from an outer hub;
     a set of integral secondary flow blades extending intermediate an inner hub and the outer hub, a flange spanning the inner hub;
   a nacelle providing a first flow duct for primary air flow from the thrust fan blades; and,
   a plurality of interconnected base gores for stator blades extending to the nacelle, the base gores interconnected to a cylindrical stator hub as a shroud aligned with the outer hub and carrying secondary air flow from the integral secondary flow blades, the blisk flange, engine core and shroud forming a plenum;
   an air diffuser extending from the shroud with the secondary air flow exiting the plenum through the diffuser for rejoinder with a primary flow from the thrust fan blades; and,
   a concentric spinner having an inner cap and a concentric outer semi-torroidal cap engaging the inner and outer hub for secondary air flow.

8. An air vehicle comprising:
   a turbine engine core including a power shaft;
   a fan blisk attached to the power shaft and spaced from the engine core, the fan blisk incorporating
     a set of thrust fan blades extending from an outer hub;
     a set of integral secondary flow blades extending intermediate an inner hub and the outer hub, a flange spanning the inner hub;
   a nacelle providing a first flow duct for primary air flow from the thrust fan blades; and,
   a secondary flow duct including a shroud aligned with the outer hub and carrying secondary air flow from the integral secondary flow blades, the flange, engine core and shroud forming a plenum and carrying flow from the integral secondary flow blades for use in a system of the air vehicle, with remaining secondary air flow exiting the plenum through the diffuser for rejoinder with a primary flow from the thrust fan blades.

9. The air vehicle of claim 8 wherein the system receiving the secondary air flow is a boundary layer control system.

10. The air vehicle of claim 8 wherein the system receiving the secondary air flow is a deicing system.

11. The air vehicle of claim 8 further comprising a concentric spinner engaging the inner and outer hub for secondary air flow, said concentric spinner including an inner cap and concentric outer semi-torroidal cap forming an inlet flow path for secondary air.

12. A method for providing secondary airflow from a ducted fan comprising:
   forming thrust blades in a fan blisk between an outer hub and a nacelle inner radius;
   forming secondary flow blades between an inner hub and the outer hub;
   mounting the fan blisk with a flange spanning the inner hub on a fan shaft; and
   providing a nacelle for flow from the thrust blades;
   providing a shroud concentric with the outer hub forming a plenum with the flange and an engine core to receive flow from the secondary flow blades; and,
   providing a secondary flow path for flow from the plenum, with remaining secondary air flow exiting the plenum through a diffuser for rejoinder with a primary flow from the thrust fan blades.

13. The method of claim 12 further comprising:
   mounting a concentric spinner with inner cap and outer toroidal cap to the inner and outer hubs respectively for entering flow into the secondary flow blades.

\* \* \* \* \*